B. TAMBURELLO.
FILLER FOR TIRES.
APPLICATION FILED NOV. 14, 1918.
1,318,026.
Patented Oct. 7, 1919.
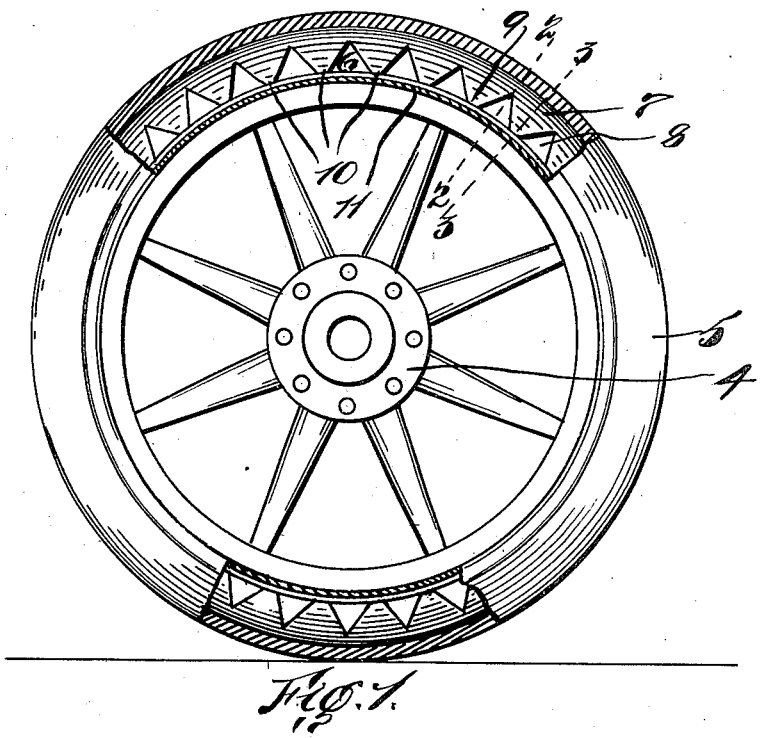
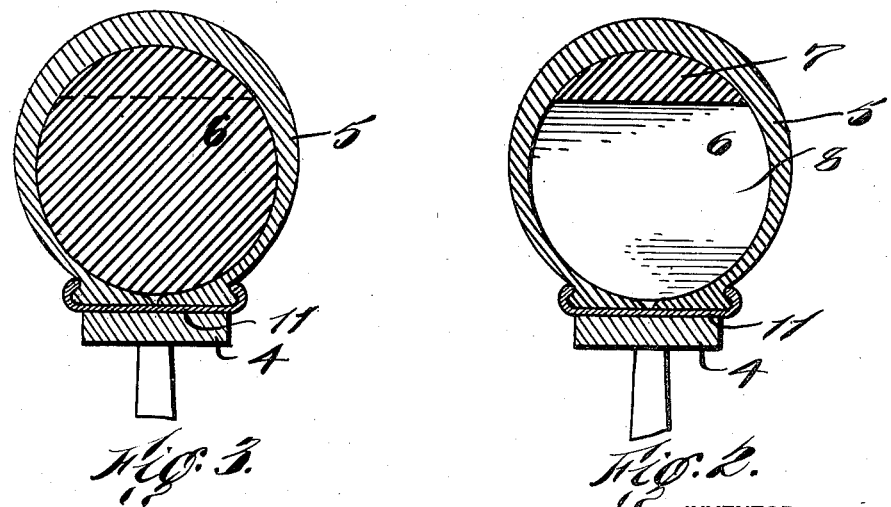
INVENTOR
Benedetto Tamburello
BY
ATTORNEY

UNITED STATES PATENT OFFICE.

BENEDETTO TAMBURELLO, OF NEW YORK, N. Y.

FILLER FOR TIRES.

1,318,026.      Specification of Letters Patent.      Patented Oct. 7, 1919.

Application filed November 14, 1918. Serial No. 262,412.

*To all whom it may concern:*

Be it known that I, BENEDETTO TAMBURELLO, a citizen of the United States of America, residing at New York city, county and State of New York, have invented certain new and useful Improvements in Fillers for Tires, of which the following is a full, clear, and exact description.

This invention relates to improvements in tire-fillers, or, in other words, a device arranged to be placed within the casing or shoe of a vehicle-tire to take the place of the usual inner pneumatic tube. One of the objects of the invention is to provide a yieldable resilient sustaining element that can be placed in the casing of a penumatic tire in lieu of a tube to contain air under pressure. One of the advantages of my improvement is that flat tires, resulting from punctures, leaking valves, blowouts, etc., cannot occur. As my improved filler is made in one piece, there will be no chafing and it can be made to snugly fit the interior of the casing, without resorting to cement, for that reason the filler can be taken from a worn out casing and placed in a new casing.

I will now proceed to describe my invention in detail, and finally claim the novel features thereof, reference being had to the accompanying drawing, wherein:—

Figure 1 illustrates my improved filler as applied to a tire shoe or casing, said casing being illustrated partly in section and partly in elevation;

Fig. 2 is an enlarged cross sectional view, the section being taken on a line 2—2 in Fig. 1; and Fig. 3 is a similar view, the section being taken on a line 3—3 in Fig. 1.

In the drawing, 4 indicates a vehicle-wheel having applied thereto the usual tire-casing or shoe 5, within which I place my improved filler, indicated by 6. The filler 6 consists of a continuous or endless ring, preferably of live rubber, indicated by 7. The ring 7 is made up virtually of a plurality of integrally connected wedge-shaped bridge members, between which openings 8 are provided, the wedge-shaped bridge members being indicated by 9. The free edge of each wedge-shaped bridge-member bears against the tire casing, as indicated by 10, Fig. 1. By providing the openings 8 I am able to produce an extremely yieldable and resilient sustaining element that compares very favorably with a tube containing air under pressure.

By providing the above named spaces or air pockets 8, the casing or shoe will readily accommodate itself to the road, as said casing is free to yield or give far more so than if the filler were solid throughout.

Having now described my invention, what I claim is:

A tire-filler comprising a continuous or endless ring of resilient material provided with a plurality of wedge-shaped openings extending outwardly from the inner periphery of the ring to a point beyond the center thereof to provide wedge-shaped bridge members extending transversely of the ring, the free edges of said bridge members engaging the tire casing.

Signed at New York city, N. Y., this 13 day of November, 1918.

BENEDETTO TAMBURELLO.

Witnesses:
    EDWARD A. JARVIS,
    MAURICE BLOCK.